Oct. 12, 1965    W. L. STEINER    3,211,831
AUTOMATIC FOCUS CONTROL SYSTEM AND METHOD
Filed May 31, 1963    2 Sheets-Sheet 1

INVENTOR.
WILFORD L. STEINER
BY *A.H. Oldham*
ATTORNEY

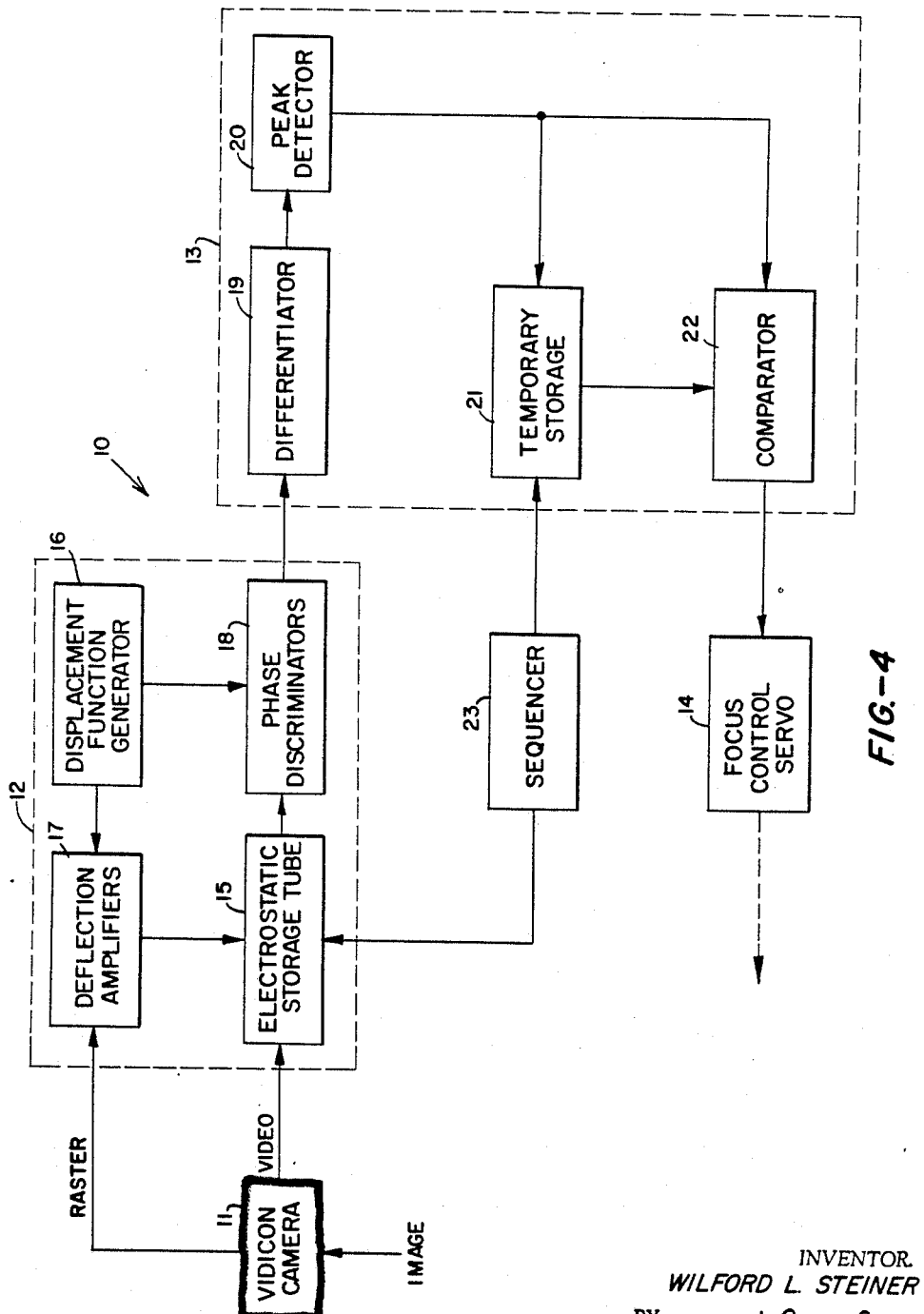

ated Oct. 12, 1965

3,211,831
AUTOMATIC FOCUS CONTROL SYSTEM AND METHOD
Wilford L. Steiner, Akron, Ohio, assignor to Goodyear Aerospace Corporation, a corporation of Delaware
Filed May 31, 1963, Ser. No. 284,741
7 Claims. (Cl. 178—7.92)

This invention relates to an automatic focus control system, and more particularly to a system which will automatically obtain and maintain optimum focus of an image utilizing the second derivative of the autocorrelation function of the image.

In high-acuity camera systems whose function is to obtain very high resolution photographs, the condition of optimum focus is critical with respect to the lens-film distance. The focussing accuracy must be held to within about 0.0005 inch in order to permit a picture resolution of one arc second. In a camera the focus of an image is effected by the lens-film distance and also by the lens-object distance. Pressure, temperature, and other factors which cause changes in the lens-film distance of as little as a few 10 thousandths of an inch may significantly reduce the focus quality of the picture. Also, since the lens itself might change under the influence of the environment, the task of measuring and maintaining a fixed distance between the principal point of the lens and the film is extremely difficult. In addition, the object distance may not be accurately controlled in an unattended reconnaissance vehicle. The process of focussing a projection system by eye is an uncertain operation. Evidence of optimum focus is observed only in passing through it, so the desired adjustment is an interpolation between two bracketing positions recognized by the eye as less than best focus. Further, limitations of the eye preclude resolving image detail in excess of about 10 lines per millimeter without additional magnification whereas enlargers are required to reproduce images of 100 lines per millimeter or greater as the quality of the camera systems improves. Thus, a focus sensing device which may be used in an automatic focus control system becomes extremely desirable.

Three general areas which appear to be most highly receptive to the automatic focus control system are high acuity cameras such as used in orbiting reconnaissance systems or reconnaissance drones and aircraft, precision enlargers in which reproduction of high resolution photographs is required with minimum degradation, and picture projectors which are frequently plagued with defocussing action caused by the film "popping" due to the heat from the light source.

It is the general object of the invention to avoid and overcome the foregoing and other difficulties of prior art practices by the provision of an automatic focus control system which utilizes relatively well known map matching techniques to obtain focus information, and which automatically compares successive readouts of the focus information to achieve the optimum point of focus.

A further object of the invention is to provide an automatic focus control system which can readily be adapted to almost any type of image focussing system, and which provides constant automatic focussing to maintain an optimum focus regardless of object-lens distance, temperature, pressure, or other outside factors.

Another object of the invention is to provide an automatic focus control system which is relatively simple, easy to fabricate, low in cost, and which provides a sustained optimum focus of the image desired.

A further object of the invention is to provide an automatic image focus system which utilizes a correlation technique to obtain the second derivative of the image autocorrelation function, which is the best indication of focus, to determine optimum focus of the image.

The aforesaid objects of the invention and other objects which will become apparent as the description proceeds, are achieved by providing in an apparatus to achieve automatic focus control of an image at a particular focus, means to store the first electronic picture of the image, means to provide a second electronic picture of the image at the same focus as the first image, means to correlate the two pictures and produce a first derivative of the autocorrelation signal, means to differentiate the first derivative signal to determine the second derivative of the image autocorrelation signal, and means to compare the second derivative signal amplitude at the particular focus with other second derivative signals obtained at different degrees of focus to determine and maintain the point of otpimum focus of the image.

For a better understanding of the invention reference should be had to the accompanying drawings, wherein:

FIGURE 4 is a functional block diagram of an automatic focus control system.

The overall problem of automatic focus control involves the detection of very small dimensional changes in the camera or certain characteristic changes in the optical image which are difficult to detect by the eye. In order to achieve an adequate automatic focus capability, a characteristic of either the camera system or the output image must be selected that will uniquely define the optimum focus condition and that will permit the determination of the correction to be applied when an out-of-focus condition has been detected.

The maximum definition attainable in any optical system comes when the system is in optimum focus. Any defocussing effect reduces the definition. Therefore, maximum definition is a valid criterion for optimum focus. Image definition which is related to both resolving power and acutance is a measure of the ability of the image to convey information. One method of sensing definition and hence focus condition is through the determination of total information content. In an optical system, optimum focus is distinguished from an out-of-focus condition by the fact that the image contains the maximum high frequency components. Since there is no limiting at the lower end of the frequency spectrum, the total information represented by the summation of all frequencies is maximum under the conditions of optimum focus.

The most convenient way to obtain a signal proportional to the total information content of an optical image is through the process of autocorrelation. The process of correlation is well known, and is particularly utilized in map matching techniques as more particularly described in patent application Serial Number 144,010 filed October 6, 1961, Serial Number 94,370 filed March 8, 1961, and Serial Number 843,034 filed September 24, 1959.

Essentially, the process of autocorrelation involves the comparison of two identical images by introducing a relative displacement between them. This produces a correlation signal or autocorrelation coefficient, which is indicated generally by the numeral 1 in FIGURE 1. If, in addition, one image is nutated and the resulting A.C. signal is phase discriminated in conjunction with the nutation, a first derivative signal, indicated by numeral 2, of the correlation signal 1 is resultant. Since only a relative value of information content is required for determining focus correction adjustment, the characteristics of the correlation signal along one image dimension only will suffice.

Figure 1:
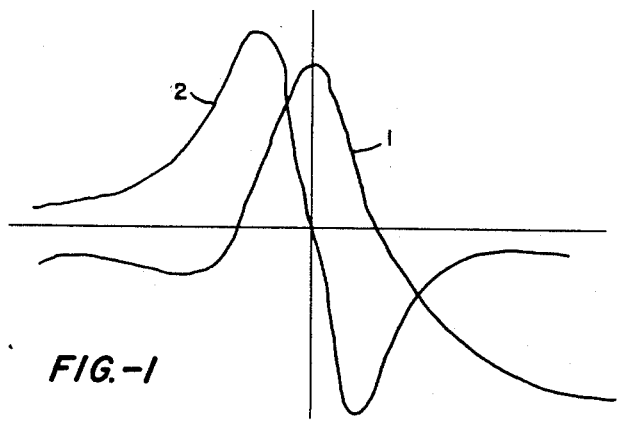
FIGURE 1 shows an autocorrelation curve and its first derivative.
Figure 2:
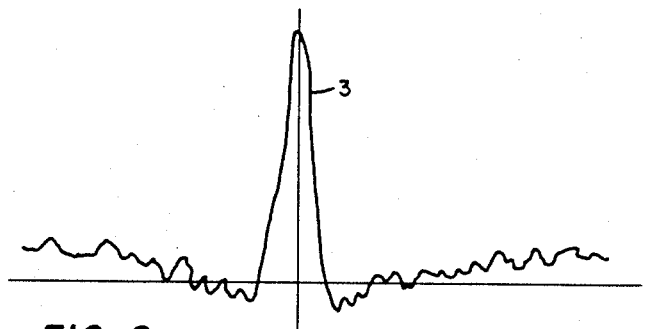
FIGURE 2 is the second derivative of the autocorrelation function of FIGURE 1.

A characteristic of the autocorrelation function that is directly related to the total information content of a picture is its sharpness. The sharpness characteristic is identified by the radius of curvature of the autocorrelation function at its peak value, and is defined as the second derivative of the autocorrelation signal. The second derivative of the correlation signal 1 indicated in FIGURE 1, is represented generally by numeral 3 in FIGURE 2. The second derivative 3 of the correlation signal is a measure of the image intensity gradient at all points in the picture. Optimizing the focus of an image is equivalent to maximizing this intensity gradient at every point throughout the picture, and this can be done by maximizing the second derivative of the autocorrelation function. The amplitude of the second derivative of the image autocorrelation curve indicates focus condition of the optical system at the time the image was produced. To detect changes in the focus condition and to determine if a better focus can be achieved in the optical system, the operation of the focus sensor requires the autocorrelation of successive images each formed after a controlled change in the focus of the optical system. Changes in the amplitudes of the second derivative curves provide adjustment direction sense for correcting the focus. In the vicinity of optimum focus the repeating measurements produce very slight correction signals and finally signals that alternate in direction sense to thus describe a "hunting" characteristic to maintain the optimum focus condition.

Figure 3:
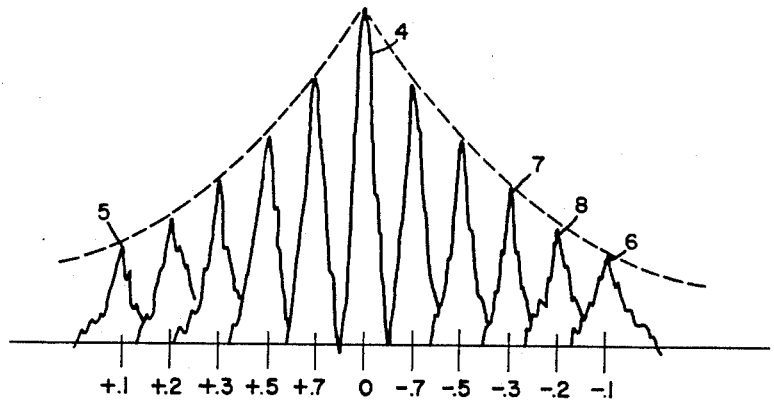
FIGURE 3 is a diagram showing the focus sensor transfer characteristic defined by the amplitude peaks of the second derivatives of the autocorrelation curves for an image at different degrees of focus.

A plurality of second derivative signals are indicated in FIGURE 3 which might represent various degrees of focus for any particular image. In actuality, the optimum focus peak indicated at 0 on the abscissa and identified by numeral 4 as compared to the lesser amplitude peaks indicated by +.1 and —.1 and identified by numerals 5 and 6 respectively, show the large change perceptible in the second derivative peak functions.

Therefore, with reference to FIGURE 3 suppose that the first second derivative peak achieved through autocorrelation were the peak corresponding to the —.3 value of focus and indicated by numeral 7. The focus would then be changed slightly in one direction or another and a second autocorrelation run which might achieve a peak indicated as —.2 and identified by numeral 8, which would thereby show that the lens was moved in the wrong direction to achieve optimum focus. Thus, the lens would be moved in the opposite direction to a distance approximating the optimum focus indicated by 0 and identified by numeral 4 on the linear scale. With each subsequent comparison the focus can be "hunting" and continuously maintaining the near optimum focal condition. With the electronic equipment described hereinafter, the autocorrelation process can be effected substantially several times every second to thereby achieve and maintain optimum focus in a very short period of time.

An automatic focus control system employing the type of focus sensor described above can be implemented by a system as shown in FIGURE 4, and indicated generally by the numeral 10. The basic components of the system 10 include a vidicon camera 11, and a correlator section indicated by the dotted block 12, a data processor section indicated by the dotted block 13, and a focus control servo 14.

The vidicon camera 11 should be mounted so that the camera system can effectively freeze the image to be focused with respect to the vidicon sensitive surface in order to avoid smearing of the image. The vidicon camera 11 feeds a video signal to an electrostatic storage tube 15 in the correlator section 12. There the video image is stored to be compared with a subsequent identical signal from the vidicon camera, to achieve the autocorrelation process, all as described heretofore. The electrostatic storage tube could be a Westinghouse storage tube WX–4293. In order to effect the nutation and linear displacement autocorrelation process described heretofore on the image in the electrostatic storage tube 15, a displacement function generator 16 and deflection amplifier 17 are provided. The amplifier 17 is driven with the same raster signal as utilized in the vidicon camera 11 so that the electronic image data picked up by the vidicon are read into the storage tube in substantially the same space coordinates as the optical data imaged on the vidicon. The function generator provides the low frequency nutation and linear displacement signals which during the correlation process deflect the rasters of vidicon image data relative to that previously stored in the storage tube. The resultant signal from the electrostatic storage tube is phase-discriminated in a phase discriminator 18 to achieve the first derivative of the autocorrelation function. This process utliizing the vidicon camera 11 and the correlation section 12 is essentially the same as the conventional map matching system mentioned heretofore, except that in this case there is no closed loop servo to maintain the images in register since here it is desired to obtain explicit correlation signals developed by controlled relative displacements.

The first derivative output from the phase discriminator 18 feeds into a differentiator 19 in the data processor section 13. The differentiator 19 derives the second derivative of the correlation signal, as described heretorfore, and a peak detector 20 receives the signal from the differentiator 19, and feeds it into a storage unit 21 and a comparator unit 22.

Now, assuming a similar correlation process has already been accomplished, there will be a second derivative peak value signal representing some degree of focus already in temporary storage in the storage unit 21 with which the amplitude of the presently detected value is compared. A sequencer unit 23 is provided to insure proper sequential operation of the components and coordinated comparison of the second derivative correlation signals. Thus, if the presently detected value is greater than the previous value, the focus control servo 14 is energized to continue the adjustment of the focus means or lens in the same direction as it had been going. However, if the presently detected value is less than the previous value, the direction of the adjustment drive must be reversed in order to correct the focus. The focus drive may be mechanized to operate continuously at a low rate or it may be designed to advance a given distance for each correction signal produced by the focus sensor. The time required to complete each sampling of the focus condition and to determine the focus correction will be only a fraction of a second.

The concept of automatic focus control described herein may have application in a wide range of optical systems because it is a self-contained system depending only upon the variations in the characteristics of the image whose focus is being controlled. Further, it is not dependent upon a given system resolution capability since the measurements made are of relative values related to the condition of focus, and it is insensitive to the scale factor or size of the image being focused.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In an apparatus to achieve automatic focus control of an image the combination of
    means to provide first electronic picture of the image at a particular focus,
    means to store the first electronic picture of the image,
    means to provide a second electronic picture of the image at the same focus as said first image, means to correlate the two pictures and produce a first derivative of the autocorrelation signal, means to differentiate the first derivative signal to determine the second derivative of the image autocorrelation, and means to compare said second derivate signal amplitude with a preceding and a subsequent second derivative signal amplitude at different degrees of focus to determine the point of optimum focus of the image.

2. In an automatic focus control system the combination of means to adjust the focus of an image, means to convert an optical image to an electrical image, means to autocorrelate two identically focused electrical images to obtain a correlation signal which is a function of the image focus and a function of the total information content of the images compared, means to differentiate the correlation signal twice to obtain the second derivative signal thereof, means to detect a peak amplitude of a second derivative signal, means to store the peak amplitude of the second derivative signal, means to compare the stored peak amplitude of the second derivative signal and subsequent peak amplitude of second derivative signals derived at different degrees of image focus to produce a compare signal, and servo means driven by the compare signal to adjust the focus means to achieve optimum focus of the image.

3. In an automatic focus control system the combination of means to autocorrelate two identically focused electrical images to obtain a correlation signal which is a function of the image focus and a function of the total information content of the images compared, means to differentiate the correlation signal twice to obtaain the second derivative signal thereof, means to detect a peak amplitude of a second derivative signal, means to store the peak amplitude of the second derivative signal, and means to compare the stored peak amplitude of the second derivative signal and subsequent peak amplitude of second derivative signals derived at different degrees of image focus to determine the point of optimum focus of the image.

4. In an automatic focus control system utilizing conventional focus means the combination of means to autocorrelate two identical focus images to achieve a correlation signal, means to double differentiate the correlation signal to obtain a second derivative signal, means to store the second derivative signal, means to autocorrelate two images focused indentically at a different focus than said first identical images to achieve a second correlation signal, means to double differentiate the second correlation signal to obtain a second second derivative signal, means to compare the second second derivative signal to said first second derivative signal, and means to control the focus means in response to the comparison of said second second derivative signal and said first second derivative signal.

5. In an automatic focus control system utilizing conventional focus means the combination of means to correlate two identical focused images to achieve a correlation signal, means to correlate two images focused identically at at different focus than said first identical images to achieve a second correlation signal, means to compare the second correlation signal to said first correlation signal, and means to control the focus means in response to the comparison of said second correlation signal and said first correlation signal.

6. A method to achieve automatic focus control of an image which includes the steps of focusing an image at a particular degree of focus by focus means, autocorrelating the images at a particular degree of focus to obtain a correlation signal, double differentiating the correlation signal to obtain the second derivative of the correlation signal, storing the second derivative signal, autocorrelating the images at a different degree of focus than said first particular degree of focus to obtain a correlation signal, double differentiating the second said correlation signal to obtain the second derivative of the second said correlation signal, comparing the stored first said second derivative signal to the second said second derivative signal to obtain a comparison signal, and driving a servo in accordance with the comparison signal to control the focus means.

7. A method to compare degrees of focus of an image which includes the steps of autocorrelating the image at one particular degree of focus, to obtain a correlation signal, double differentiating said correlation signal to obtain the second derivative thereof, autocorrelating the image at a second particular degree of focus to obtain a second correlation signal, double differentiating said second correlation signal to obtain the second derivative thereof, and comparing said first second derivative correlation signal with said second second derivative correlation signal.

References Cited by the Examiner
UNITED STATES PATENTS 2,838,600 6/58 Salinger _____ 178—7.92
2,999,436 9/61 Faulhaber _____ 178—7.2 X DAVID G. REDINBAUGH, *Primary Examiner.*